United States Patent
Mitten et al.

(10) Patent No.: US 6,895,481 B1
(45) Date of Patent: May 17, 2005

(54) SYSTEM AND METHOD FOR DECREMENTING A REFERENCE COUNT IN A MULTICAST ENVIRONMENT

(75) Inventors: John W. Mitten, Cary, NC (US); William R. Lee, Apex, NC (US); Kenneth H. Potter, Raleigh, NC (US)

(73) Assignee: Cisco Technology, Inc., San Jose, CA (US)

( * ) Notice: Subject to any disclaimer, the term of this patent is extended or adjusted under 35 U.S.C. 154(b) by 285 days.

(21) Appl. No.: 10/189,660

(22) Filed: Jul. 3, 2002

(51) Int. Cl.⁷ .............................................. G06F 12/00
(52) U.S. Cl. .................. 711/154; 709/250; 370/498
(58) Field of Search .................. 711/154; 709/250; 370/498

(56) References Cited

U.S. PATENT DOCUMENTS

| | | | | |
|---|---|---|---|---|
| 5,720,032 A | * | 2/1998 | Picazo et al. ............... 709/250 |
| 5,819,287 A | | 10/1998 | Tsuoka ...................... 707/104 |
| 5,920,566 A | | 7/1999 | Hendel et al. .............. 370/401 |
| 5,938,736 A | | 8/1999 | Muller et al. ............... 709/243 |
| 5,951,651 A | | 9/1999 | Lakshman et al. .......... 709/239 |
| 6,014,380 A | | 1/2000 | Hendel et al. .............. 370/392 |
| 6,016,310 A | | 1/2000 | Muller et al. ............... 370/255 |
| 6,029,197 A | | 2/2000 | Erimli et al. ............... 709/223 |
| 6,044,087 A | | 3/2000 | Muller et al. ............... 370/463 |
| 6,044,418 A | | 3/2000 | Muller ........................ 710/56 |
| 6,049,528 A | | 4/2000 | Hendel et al. .............. 370/235 |
| 6,052,738 A | | 4/2000 | Muller et al. ............... 709/250 |
| 6,061,362 A | | 5/2000 | Muller et al. ............... 370/463 |
| 6,081,512 A | | 6/2000 | Muller et al. ............... 370/256 |
| 6,081,522 A | | 6/2000 | Hendel et al. .............. 370/389 |
| 6,088,356 A | | 7/2000 | Hendel et al. .............. 370/392 |
| 6,094,435 A | | 7/2000 | Hoffman et al. ............ 370/414 |
| 6,119,196 A | | 9/2000 | Muller et al. ............... 710/243 |
| 6,128,666 A | | 10/2000 | Muller et al. ............... 709/238 |
| 6,151,326 A | | 11/2000 | McGuire et al. ............ 370/402 |
| 6,175,571 B1 | | 1/2001 | Haddock et al. ............ 370/423 |
| 6,216,171 B1 | | 4/2001 | Isono et al. ................. 709/250 |
| 6,246,680 B1 | | 6/2001 | Muller et al. ............... 370/389 |
| 6,396,841 B1 | | 5/2002 | Co et al. ..................... 370/401 |
| 6,512,767 B1 | | 1/2003 | Takeda et al. .............. 370/389 |
| 6,519,709 B1 | | 2/2003 | Kawauchi .................... 713/400 |
| 6,543,898 B1 | | 4/2003 | Griffin et al. ............... 351/243 |
| 6,639,917 B1 | | 10/2003 | Ellington, Jr. et al. ...... 370/401 |
| 6,744,771 B1 | | 6/2004 | Barber et al. ............... 370/400 |
| 6,745,243 B2 | | 6/2004 | Squire et al. ............... 709/227 |
| 6,771,646 B1 | | 8/2004 | Sarkissian et al. .......... 370/392 |

* cited by examiner

Primary Examiner—Nasser Moazzami
Assistant Examiner—Thang Ho
(74) Attorney, Agent, or Firm—Baker Botts L.L.P.

(57) ABSTRACT

A method for decrementing a reference count in a multicast environment is provided that includes receiving an access request for a particle stored in a memory element. The memory unit is then accessed in response to the access request, the particle being read from the memory element. The particle includes a plurality of data segments, a selected one or more of which includes a first reference count associated with the particle. The particle is then presented to a target that generated the access request. The first reference count associated with the selected one or more data segments is then decremented in order to generate a second reference count. At least one of the plurality of data segments with the second reference count is then written to the memory element.

20 Claims, 2 Drawing Sheets

SYSTEM AND METHOD FOR DECREMENTING A REFERENCE COUNT IN A MULTICAST ENVIRONMENT

TECHNICAL FIELD OF THE INVENTION

This invention relates in general to the field of multicast communications and more particularly to a system and method for decrementing a reference count in a multicast environment.

BACKGROUND OF THE INVENTION

Multicast communications have grown increasingly important and complex in networking architectures. Multicasting generally refers to a scenario in which multicast packets are routed to multiple destinations and generally replicated an appropriate number of times. Each particle of a multicast packet generally includes a reference count, which offers some information about the number of intended targets for the data. As a particle is created an element may operate to set the reference count, whereby once the particle's reference count reaches '0' it is generally freed by the system. When a target identifies itself as ready to receive a portion of data, the data needs to be accessed and read from a memory location. In some environments, a problem is presented when a multicast packet or a data segment is stored in some memory unit and then recalled by multiple targets simultaneously. This may also present a problem in cases where the target does not yet know the correct value of the reference count or what other potential targets may also be attempting to access the data. The time interval required to adequately modify the reference count must be kept to a minimum, as such an operation generally inhibits system speed.

In cases where the target opts to wait to receive the data before modifying the reference count, another target may also access the data concurrently and thus retrieve an invalid reference count. In addition, other problems may be presented where the modified reference count is corrupted when written back to the memory unit by either the first target seeking access to the data or a subsequent target. These problems may result in corrupted data segments, inferior data communication speeds, inefficient uses of networking resources, and poor performance characteristics for associated multicasting operations.

SUMMARY OF THE INVENTION

From the foregoing, it may be appreciated by those skilled in the art that a need has arisen for an improved multicast communications approach that provides the capability for devices or components to identify and appropriately modify a reference count. In accordance with one embodiment of the present invention, a system and method for decrementing a reference count in a multicast environment are provided that substantially eliminate or greatly reduce disadvantages and problems associated with conventional multicasting techniques.

According to one embodiment of the present invention, there is provided a method for decrementing a reference count in a multicast environment that includes receiving an access request for a particle stored in a memory element. The memory unit is then accessed in response to the access request, the particle being read from the memory element. The particle includes a plurality of data segments, a selected one or more of which includes a first reference count associated with the particle. The particle is then presented to a target that generated the access request. The first reference count associated with the selected one or more data segments is then decremented in order to generate a second reference count. The selected data segment with the second reference count is then written to the memory element.

Certain embodiments of the present invention may provide a number of technical advantages. For example, according to one embodiment of the present invention a multicast approach is provided that prevents corruption of the reference count value while minimizing the impact to memory efficiency. This is a result of the memory arbiter, which is able to identify the multicast read transaction and thus the auto-decrement is only used as needed on the external memory interface. This provides for the accurate transmission of data as it is accessed by multiple targets in a multicast environment.

Another technical advantage associated with one embodiment of the present invention is the result of the ability to modify the reference count more directly. Because the reference count may be modified by the memory controller (rather than the target seeking to access or read the data), the entire transaction or task requires fewer processing cycles to complete. This may be significant as the memory arbiter blocks other accesses to a data packet while the auto-decrement procedure is being executed. Additionally, memory efficiency and multicast resource allocation is generally enhanced because the reference count value may be decremented by a value of 'N.' This allows the reference count value to be reduced in a single access by a selected number 'N,' rather than repeatedly accessing a data segment in order to decrement its associated reference count value a suitable number of times.

Yet another technical advantage associated with one embodiment of the present invention relates to the ability to free individual particles as their reference count becomes '0.' This stands in contrast to other systems that require a waiting period for the entire packet to be freed before moving to a next processing operation or task. This provides for increased system speed as individual particles are freed more quickly. Embodiments of the present invention may enjoy some, all, or none of these advantages. Other technical advantages may be readily apparent to one skilled in the art from the following figures, description, and claims.

BRIEF DESCRIPTION OF THE DRAWINGS

To provide a more complete understanding of the present invention and features and advantages thereof, reference is made to the following description, taken in conjunction with the accompanying figures, wherein like reference numerals represent like parts, in which.

DETAILED DESCRIPTION OF THE INVENTION

Figure 1A:
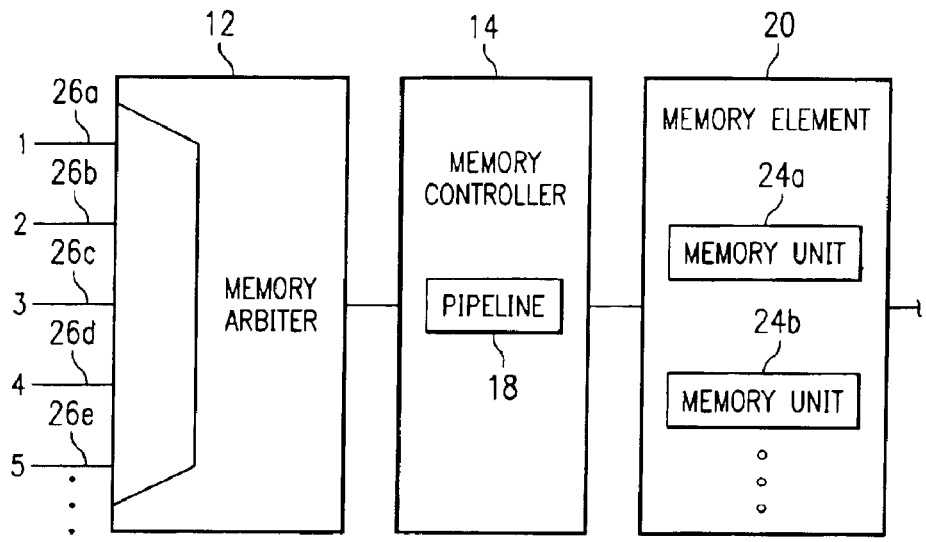
FIG. 1A is a simplified block diagram of a system for decrementing a reference count in a multicast environment.

FIG. 1A is a simplified block diagram of a system 10 for decrementing a reference count in a multicast environment.

System 10 includes a memory arbiter 12, a memory controller 14 that includes a pipeline 18, and an memory element 20 that includes multiple memory units 24a and 24b. System 10 also includes a number of inputs 26a–26e that represent a series of links to multiple targets which seek to access data or information from memory element 20. System 10 may be included in any suitable component or hardware, such as within an integrated circuit (or an application specific integrated circuit (ASIC)), an electrically erasable programmable read only memory (EEPROM), or a field programmable gate array (FPGA) for example.

According to the teachings of the present invention, memory controller 14 operates to automatically decrement a reference count value associated with a particle that may include multiple data segments stored in memory element 20. After the particle is read and the reference count value appropriately decremented, the entire particle or selected data segments may then be written back out to memory element 20, thereby preventing corruption of the reference count value during this process. System 10 could read the entire particle and then write a data segment to memory element 20 or alternatively system 10 could read the first data segment and then write the first data segment before proceeding to read the remaining data segments. This operation insures that all targets seeking to access data segments within memory element 20 receive an accurate reference count value when the data segment is read. Because memory controller 14 identifies which targets are requesting certain data segments, it may adequately prevent any other targets from accessing the multicast data segments until the reference count value has been properly decremented and stored back into memory element 20.

This decrementing feature may be accomplished in a number of suitable fashions. For example, this may be accomplished through a multicast read indicator that may be sent with the packet address from the target to memory arbiter 12 (and on to memory controller 14). Memory controller 14 accesses memory element 20 and acquires the target data, including the reference count value. This data may be presented to the intended target while memory controller 14 is decrementing the reference count value and writing the new data (including this modified value of the reference count) to memory element 20. Accordingly, future access of data segments by other targets receive an accurate and correct reference count value from memory element 20, a reference count value not susceptible to corruption.

Memory arbiter 12 is a multicast communications element that provides an interface between multiple targets that seek access to specific data and memory controller 14. Memory arbiter 12 may include any suitable software, hardware, element, or object operable to execute data exchanges or to provide such an interface. Memory arbiter 12 may be included within memory controller 14 (or vice versa) where appropriate and may operate to access data segments stored in memory element 20. Memory controller 14 accesses specific data segments in response to access requests generated or otherwise provided by targets that are illustrated as inputs 26a–26e. Inputs 26a–26e represent connections or couplings to central processing units (CPUs) or other suitable processing elements or entities that seek access to memory element 20 for the purpose of reading data from any one or more of memory units 24a or 24b included therein. Certain architectures may store data segments or particles among multiple units where appropriate and according to particular needs. Each target coupled to inputs 26a–26e may read the particles of a packet in a link-list order. However, in the case of multiple targets seeking to access data, these reads may be at different stages in the process and executed at any given speed.

Memory arbiter 12 is generally responsible for arbitrating accesses among inputs 26a–26e. This arbitration operates to select specific targets or processors to access memory element 20. Any suitable number of targets may be arbitrated by memory arbiter 12, which may designate access to memory element 20 in a round-robin fashion in accordance with a particular embodiment of the present invention. Alternatively, memory arbiter 12 may use any other suitable protocol in allowing access to memory element 20.

Memory arbiter 12 may identify the targets that are requesting data and further prevent other targets from accessing the data until the reference count has been properly decremented and stored back out to memory element 20. In accordance with an alternative embodiment of the present invention, memory arbiter 12 may execute this operation through a multicast read indicator that may be provided with the packet address from the target to memory controller 14 in accordance with the teachings of the present invention. Alternatively, memory arbiter 12 may include any other suitable information with the packet address such that access to the selected data segment is prohibited by other processors until the reference count value has been properly decremented.

Memory controller 14 is a component that operates to access selected portions of memory element 20 in response to a request for access that is generated, communicated, or otherwise provided by memory arbiter 12. Memory controller 14 may include any suitable software, hardware, element, or object operable to execute this function. Memory controller 14 may also include pipeline 18 which facilitates the delivery and reception of data or information sought to be read or written in system 10. Memory controller 14 may additionally include a state machine where appropriate that operates to store or otherwise process selected information as it propagates through memory controller 14.

Arbitrated accesses to memory element 20 may be subsequently reordered by memory controller 14 in order to increase memory efficiency. For example, writes and reads may be grouped together where appropriate, or requests may be reordered based on their respective memory bank addresses. This allows system 10 to achieve better memory efficiency as requests from a single source are generally not reordered. Reordering may be initiated generally for requests from different sources. This operation may negate some of the arbitration effects but these exchanges are generally meant to be minimal and not effect the overall bandwidth for a given source.

Memory controller 14 may access memory element 20 and acquire targeted data including the reference count value. This data may be presented to the intended target i.e. selected inputs 26a–26e. As the selected information is being provided to a target, memory controller 14 may operate to write the new data (with a modified reference count value) back out to memory element 20. Accordingly, future accesses of the multicast data by other targets receive an uncorrupted correct reference count value from memory element 20.

In operation of an example embodiment, memory controller 14 automatically decrements the reference count value for a data segment stored within memory element 20. Each packet may include a number of particles that further comprise a suitable number of data segments, whereby each particle of the packet is stored with its own reference count value. This allows a multicast system to track the data on a per-particle basis (as opposed to tracking the entire packet with one value). This may be significant in cases where certain particles are accessed by various targets at different rates. This may also give the corresponding hardware or software the ability to free individual particles once they have been used by all targets without waiting for the entire packet to be read. The ability of memory controller 14 to automatically decrement the reference count value prevents corruption of the reference count value and ensures that all targets receive the proper reference count when the data is read.

Memory element 20 is a memory element that stores information to be accessed by memory controller 14. Memory element 20 may be an external memory unit or provided external to any number of elements within system 10. In a particular embodiment of the invention, memory element 20 may include multiple memory units 24a and 24b that may each operate to store data or information that is sought by any number of targets. Memory units 24a and 24b may be any suitable memory element, such as dynamic random access memory (DRAM), fast cycle RAM (FCRAM), static RAM (SRAM), an FPGA, an erasable programmable read-only memory (EPROM), an EEPROM, a microcontroller, a microprocessor, or any other suitable memory element, device, or object that operates to store data. Memory element 20 or memory units 24a and 24b may include a number of data segments. These reference count values may be modified in accordance with the teachings of the present invention as they are accessed and read within system 10. Memory element 20 may be separated into a suitable number of data segment portions where appropriate and according to particular needs.

Figure 1B:
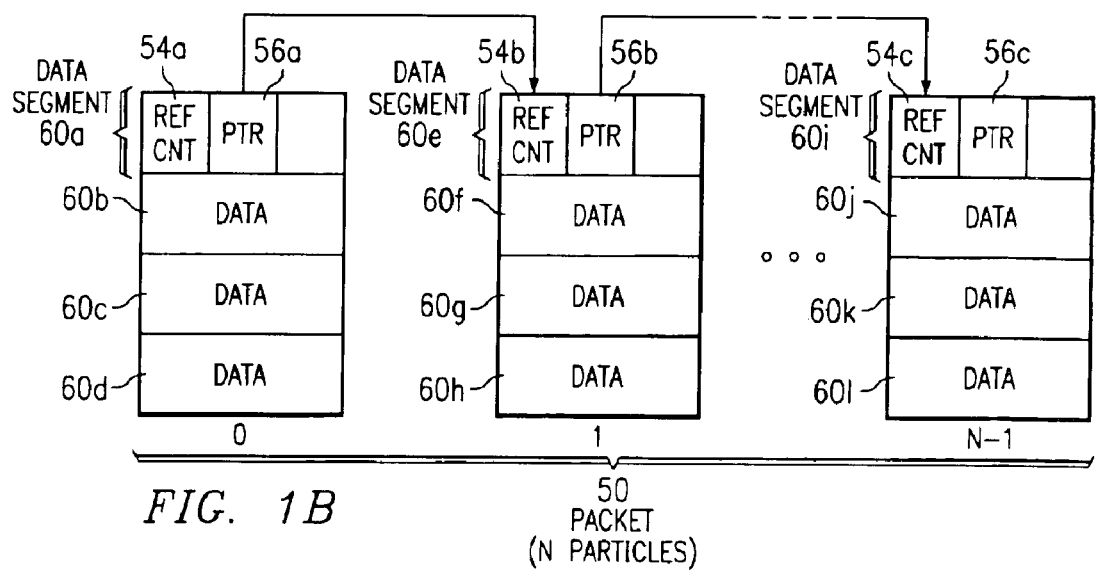
FIG. 1B is a simplified block diagram of an example packet that propagates through the system for decrementing the reference count.

FIG. 1B is a simplified block diagram of an example multicast data packet 50 that includes multiple particles that may propagate through system 10. The packet may comprise 'N' particles arranged in a linked-list fashion in accordance with a particular embodiment of the present invention. Each particle may include a reference count 54a–54c, a pointer 56a–56c, and multiple data segments 60a–l. Each data segment 60a–l generally represents a single memory operation's worth of data. The 4-data segment particle as illustrated in FIG. 1B is offered for purposes of teaching only. Where appropriate, any suitable number of data segments may be included in a particle in accordance with particular needs.

Pointers 56a–56c of each particle operate to direct operations from one particle (inclusive of a reference count positioned in any suitable location) to the next of each respective particle. An entire particle may be read at once; however, in executing a decrement, only a portion of the particle or individual data segment (inclusive of the reference count) needs to be written back to a next destination. Thus, in the example provided in FIG. 1B, four memory reads may be followed by a single memory write. In operation of an example embodiment, input 26c (or target #3) may wish to access multicast data packet 50 from memory element 20. A read execution may then be properly scheduled, whereby the data sought will be retrieved from memory element 20 and moved from memory element 20 to memory controller 14. The reference count value, generally provided in the first data segment (as illustrated in FIG. 1B) of the particle, may then be adequately decremented. Memory arbiter 12 may then receive the data back after a suitable number of processing cycles. Memory controller 14 may then schedule a write to the same address. Once the read data arrives, memory controller 14 may decrement the reference count value and then write a data segment or an entire particle where appropriate. The read data flows out of memory arbiter 12 and is presented to target #3, provided as input 26c. The data may be written by memory controller 14 (at potentially a time concurrent to the data being presented to the designated target), whereby the reference count value is subtracted by one (the default value) or by 'N' where appropriate.

As this process is being executed, memory arbiter 12 is concurrently scheduling or deciding which targets will access the data subsequently. If for example input 26d (target #4) were to initiate a multicast read from the same address, input 26d would need the reference count value also. Memory controller 14 operates to stall (for any number of appropriate cycles) access to that address for read or write tasks during the access operation until the corresponding data is written back to memory element 20. Subsequently, the address may be opened back up, whereby additional elements or targets may freely access the information.

Figure 2:
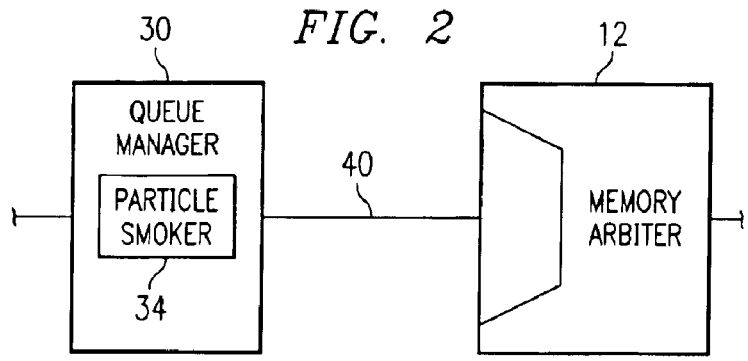
FIG. 2 is a simplified block diagram of a queue manager that may be included within the system.

FIG. 2 is a simplified block diagram of a queue manager 30 that includes a particle smoker 34 in accordance with one embodiment of the present invention. Queue manager 30 operates generally to manage requests for data or information stored in memory element 20. The request may be initiated by a single target that is generally associated with inputs 26a–26e. Alternatively, the requests for access to memory element 20 may be managed by any suitable element, object, or entity.

Queue manager 30 is an element that operates as an interface between memory arbiter 12 and elements that seek to access to memory element 20. Queue manager 30 may include any number of suitable buffers and registers where appropriate and according to specific requirements of individual architectures or configurations. Queue manager 30 may be coupled to any of inputs 26a–26e or via a single port 40 where appropriate and operates to facilitate the delivery of requested information within system 10. Queue manager 30 may also identify the actual decrementing value in accordance with a particular embodiment of the present invention. Queue manager 30 may additionally manage over-subscription to memory element 20. For example, queue manager 30 may recognize that a multicast read has been initiated and that the decrementing operation must exceed the value of one (or default) during the execution. This may be included as part of the read command, whereby part of the read command provides the count for the decrement. In non-over-subscribed situations, the decrement value may be generally one or any other suitable number according to particular needs.

Particle smoker 34 is an interface included within queue manager 30 in accordance with one embodiment of the present invention. Particle smoker 34 may be used to free up or release unused particles within system 10. Particle smoker 34 operates in conjunction with memory controller 14 in order to decrement the reference count value by 'N' rather than by one. This may be significant in error cases where the data was not read by all intended targets but the particle needs to be freed as quickly as possible. This allows memory controller 14 to write the desired or selected value of the reference count value back to memory element 20 with one instruction, rather than requiring particle smoker 34 to read the multicast data 'N' times, which inhibits memory efficiency.

Figure 3:
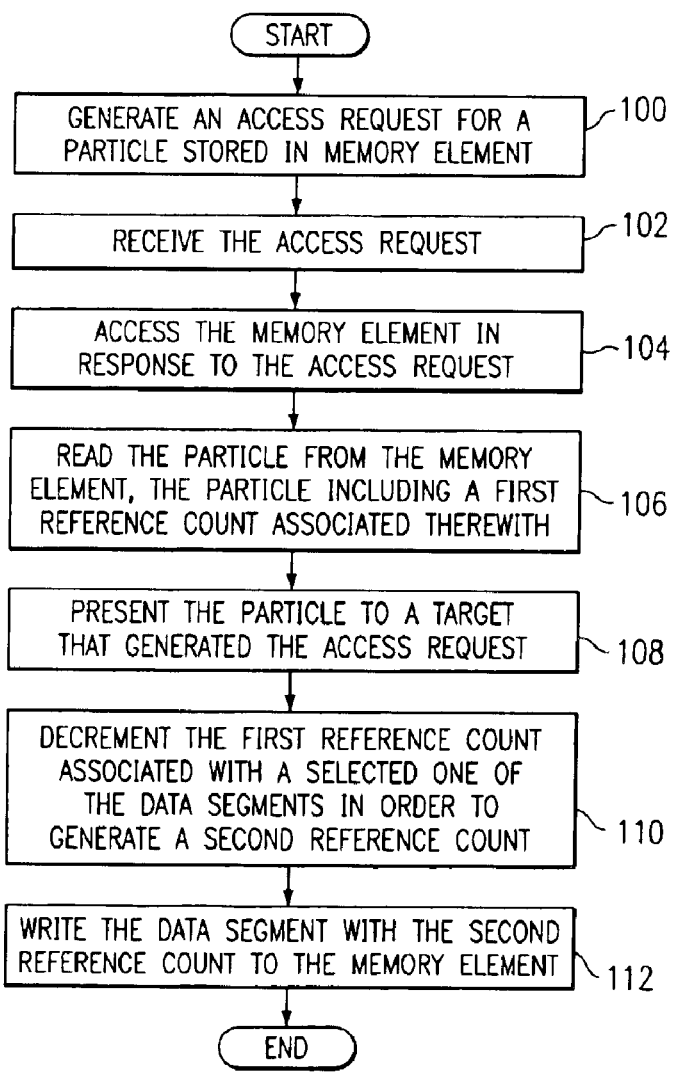
FIG. 3 is a flowchart illustrating a series of steps associated with a method for decrementing a reference count in a multicast environment.

FIG. 3 is a flowchart illustrating a series of steps associated with a method for decrementing a reference count in a multicast environment. The method begins at step 100 where an access request is generated for a particle stored in memory element 20. The particle includes multiple data segments. One of the data segments may include a first reference count. The access request may be generated and communicated by the target. A multicast read indicator and an address associated with the particle may be included in the access request such that access to the address is prevented until the particle is properly written to memory element 20. The access request may then be received at step 102 and access to memory element 20 initiated in response to the access request at step 104. Queue manager 30 or any other suitable element may operate to manage one or more access requests for one or more data segments included within memory element 20. In addition, any suitable arbitration protocol may be implemented in order to select access requests where appropriate and according to particular needs.

At step 106, the particle may be acquired or read from memory element 20. The particle may then be presented to a target that generated the access request at step 108. During this time, access to an address associated with the particle may be prevented until a selected data segment is written to memory element 20. At step 110, the first reference count value associated with the selected data segment may be decremented in order to generate a second reference count. The second reference count may be viewed as a revised first reference or a replacement thereof. In other embodiments, the second reference count may be viewed as a new count. It is important to note that in certain environments, the reference count may be divided among multiple data segments. As such, the selected data segment of step 110 is inclusive of multiple data segments where appropriate. At step 112, the selected data segment with the second reference count may be written to memory element 20 (potentially in the same location associated with the first reference count). Alternatively, some or all of the data segments within the particle may be written to memory element 20 or any other suitable next destination.

Some of the steps illustrated in FIG. 3 may be changed or deleted where appropriate and additional steps may also be added to the flowchart. These changes may be based on specific communication system architectures or particular arrangements and configurations of associated memory elements and components and do not depart from the scope or the teachings of the present invention.

Although the present invention has been described in detail with reference to particular embodiments, it should be understood that various other changes, substitutions, and alterations may be made hereto without departing from the spirit and scope of the present invention. For example, although the present invention has been described as operating in specific environments, the present invention may support any internet protocol (IP) packet-based communications having any maximum transmission unit (MTU) size. This is inclusive of any suitable networking architectures or arrangements that implement the use of reference counts in accessing and reading data.

Additionally, although the present invention has been described with reference to integrated circuits, ASICs, FPGAs, and other suitable structures, the present invention may be used in conjunction with any element associated with data that includes a reference count value to be modified. Such elements may include micro-processing architectures, EPROMs and EEPROMS, and microcontrollers for example. Any system that includes the use of data segments included in particles having a reference count associated therewith (which is systematically decremented) may benefit from the teachings of the present invention.

Numerous other changes, substitutions, variations, alterations, and modifications may be ascertained by those skilled in the art and it is intended that the present invention encompass all such changes, substitutions, variations, alterations, and modifications as falling within the spirit and scope of the appended claims. Moreover, the present invention is not intended to be limited in any way by any statement in the specification that is not otherwise reflected in the appended claims.

What is claimed is:

1. A method for decrementing a reference count in a multicast environment, comprising:

receiving an access request for a particle stored in a memory element, wherein the particle includes a plurality of data segments, a selected one or more of the data segments including a reference count;

accessing the memory element in response to the access request;

reading the particle from the memory element;

presenting the particle to a target that generated the access request;

decrementing the first reference count associated with the selected one or more of the data segments in order to generate a second reference count;

writing at least one of the plurality of the data segments with the second reference count to the memory element; and preventing access to an address associated with the particle until the data segment with the second reference count is written to the memory element.

2. The method of claim 1, further comprising:

communicating the access request to the memory element by the target; and communicating the address and a multicast read indicator with the access request such that access to the address is prevented until the data segment with the second reference count is written to the next the memory element.

3. The method of claim 1, further comprising:

managing one or more access requests for one or more particles included within the memory element with a queue manager, the access requests being generated by one or more targets that seek to access one or more particles within the memory element.

4. The method of claim 1, further comprising:

decrementing the first reference count a selected number of times using a particle interface such that the second reference count is generated, the particle interface being coupled to the target.

5. A system for decrementing a reference count in a multicast environment, comprising:

means for receiving an access request for a particle stored in a memory element, wherein the particle includes a plurality of data segments, a selected one or more of the data segments including a reference count;

means for accessing the memory element in response to the access request;

means for reading the particle from the memory element;

means for presenting the particle to a target that generated the access request;

means for decrementing the first reference count associated with the selected one or more of the data segments in order to generate a second reference count;

means for writing at least one of the plurality of the data segments with the second reference count to the memory element; and means for preventing access to an address associated with the particle until the data segment with the second reference count is written to the memory element.

6. The system of claim 5, further comprising:
means for communicating the access request to the memory element by the target; and
means for positioning the address and a multicast read indicator in the access request such that access to the address is prevented until the data segment with the second reference count is written to the memory element.

7. The system of claim 5, further comprising:
means for managing one or more access requests for one or more particles included within the memory element with a queue manager, the access requests being generated by one or more targets that seek to access one or more particles within the memory element.

8. The system of claim 5, further comprising:
means for decrementing the first reference count a selected number of times such that the second reference count is generated.

9. A computer readable medium having code for decrementing a reference count in a multicast environment, the code operable to:
receive an access request for a particle stored in a memory element, wherein the particle includes a plurality of data segments, a selected one or more of the data segments including a reference count;
access the memory element in response to the access request;
read the particle from the memory element;
present the particle to a target that generated the access request;
decrement the first reference count associated with the selected one or more of the data segments in order to generate a second reference count;
write at least one of the plurality of the data segments with the second reference count to the memory element; and
prevent access to an address associated with the particle until the data segment with the second reference count is written to the memory element.

10. The code of claim 9, further operable to:
communicate the access request to the memory element by the target; and
position the address and a multicast read indicator in the access request such that access to the address is prevented until the data segment with the second reference count is written to the memory element.

11. The code of claim 9, further operable to:
manage one or more access requests for one or more particles included within the memory element with a queue manager, the access requests being generated by one or more targets that seek to access one or more particles within the memory element.

12. The code of claim 9, further operable to:
decrement the first reference count a selected number of times such that the second reference count is generated.

13. An apparatus for decrementing a reference count in a multicast environment, comprising:
a memory arbiter operable to generate an access request for a particle stored in a memory element, wherein the particle includes a plurality of data segments, a selected one or more of the data segments including a first reference count associated therewith; and
a memory controller operable to receive the access request and to access the memory element in response to the access request, the memory controller reading the particle from the memory element, the particle being presented to a target coupled to the memory arbiter that generated the access request, the first reference count associated with the selected one or more of the data segments being decremented by the memory controller in order to generate a second reference count, wherein at least one of the data segments with the second reference count is written by the memory controller to the memory element, and wherein the memory arbiter is further operable to prevent access to an address associated with the particle until the data segment with the second reference count is written to the memory element.

14. The apparatus of claim 13, wherein the access request includes the address and a multicast read indicator such that access to the address is prevented until the data segment with the second reference count is written to the memory element.

15. The apparatus of claim 13, further comprising:
a queue manager operable to manage one or more access requests for one or more particles included within the memory element, the access requests being generated by one or more targets that seek to access one or more of the particles.

16. The apparatus of claim 15, wherein the queue manager further comprises a particle smoker element coupled thereto that is operable to provide a value to the memory controller for decrementing the first reference count a selected number of times in order to generate the second reference count.

17. The apparatus of claim 13, further comprising:
a pipeline element included within the memory controller and operable to facilitate data exchanges between the memory element and the memory arbiter.

18. The apparatus of claim 13, further comprising:
an application specific integrated circuit (ASIC), the ASIC including the memory arbiter and the memory controller.

19. The apparatus of claim 13, further comprising:
a field programmable gate array (FPGA), the FPGA including the memory arbiter and the memory controller.

20. An apparatus for decrementing a reference count in a multicast environment comprising:
a memory arbiter operable to generate an access request for a particle stored in a memory element, wherein the particle includes a plurality of data segments, a selected one or more of the data segments including a first reference count associated therewith;
a memory controller operable to receive the access request and to access the memory element in response to the access request, the memory controller reading the particle from the memory element, the particle being presented to a target coupled to the memory arbiter that generated the access request, the first reference count associated with the selected one or more of the data segments being decremented by the memory controller in order to generate a second reference count, wherein at least one of the data segments with the second reference count is written by the memory controller to the memory element, the access request including the address and a multicast read indicator such that access to the address is prevented until the data segment with the second reference count is written to the memory element; and
a queue manager operable to manage one or more access requests for one or more particles included within the memory element.

* * * * *